July 29, 1924.
G. W. PRICE
1,502,745
COOLING APPARATUS FOR MOTOR VEHICLES
Filed Aug. 28, 1922    3 Sheets-Sheet 1
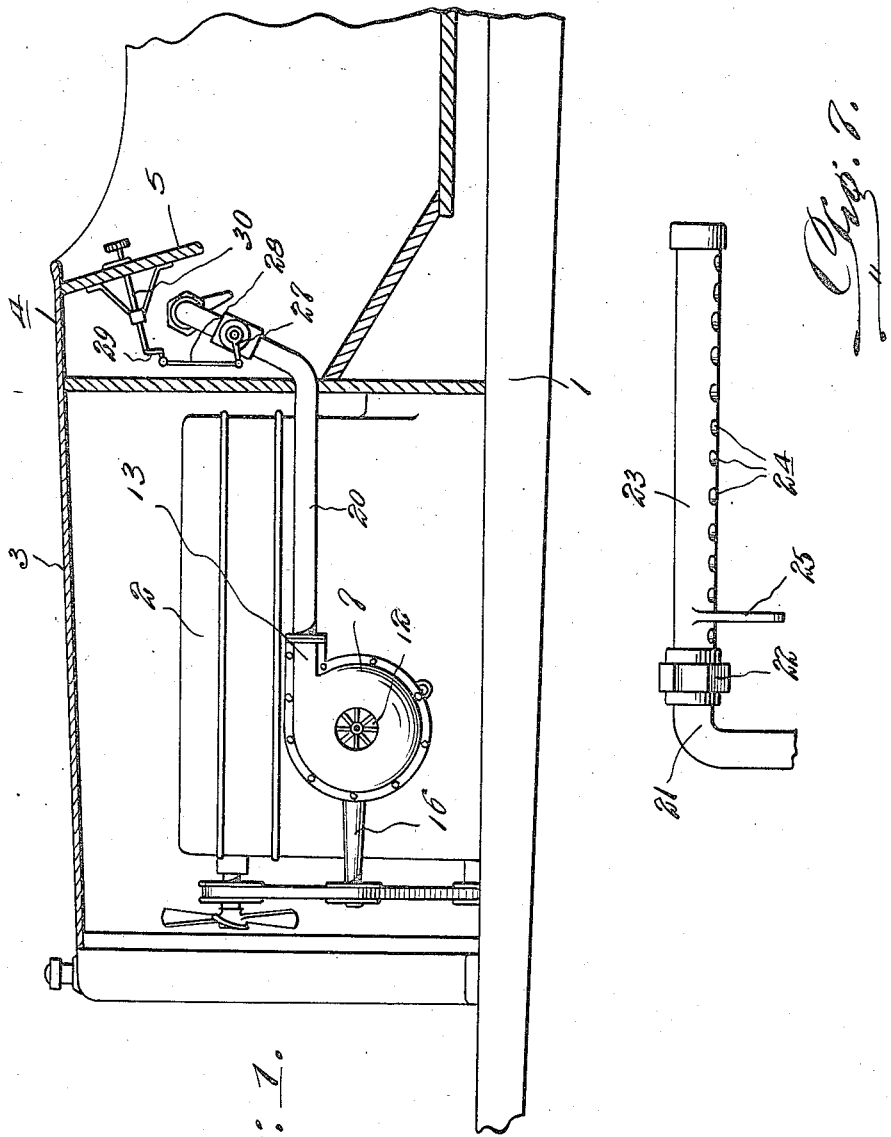

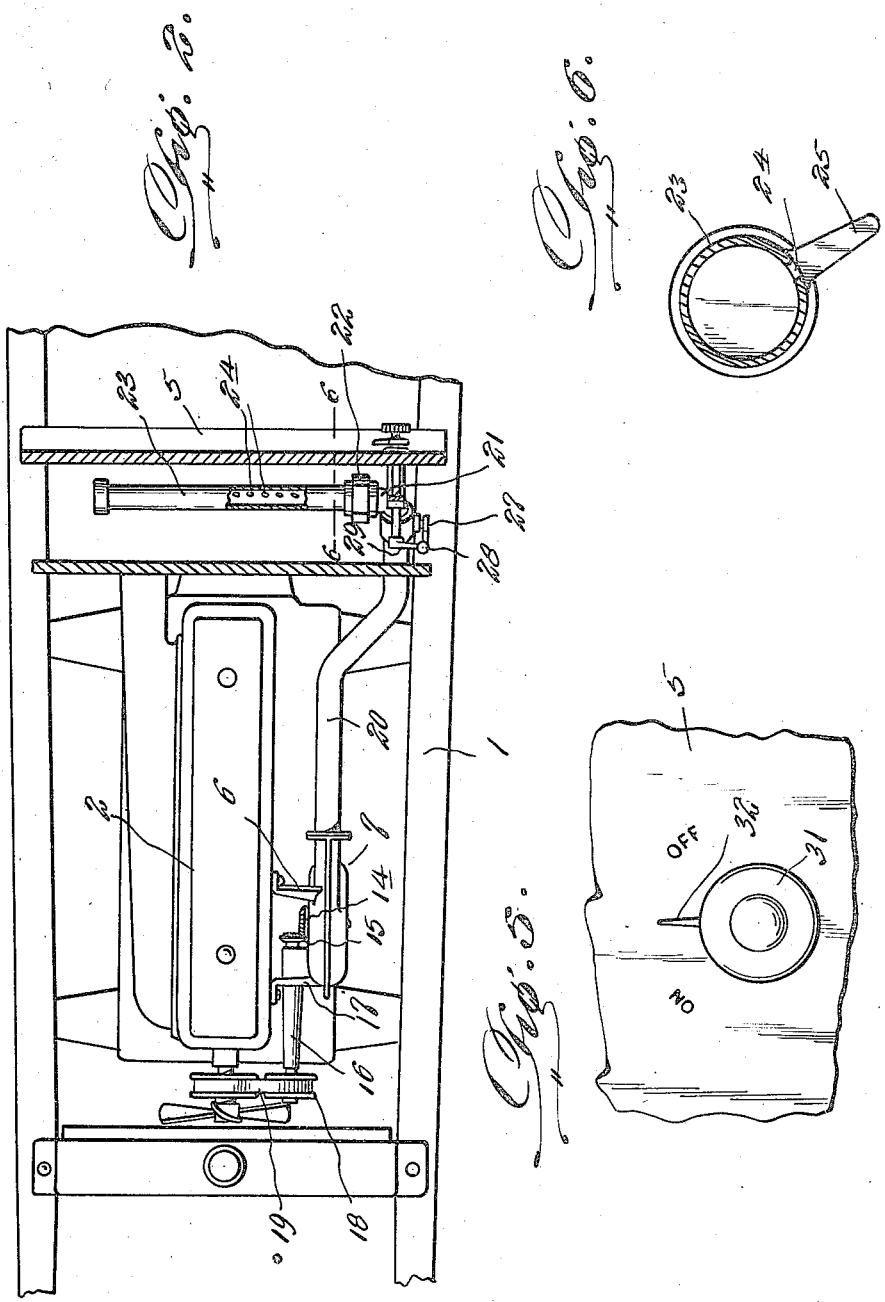

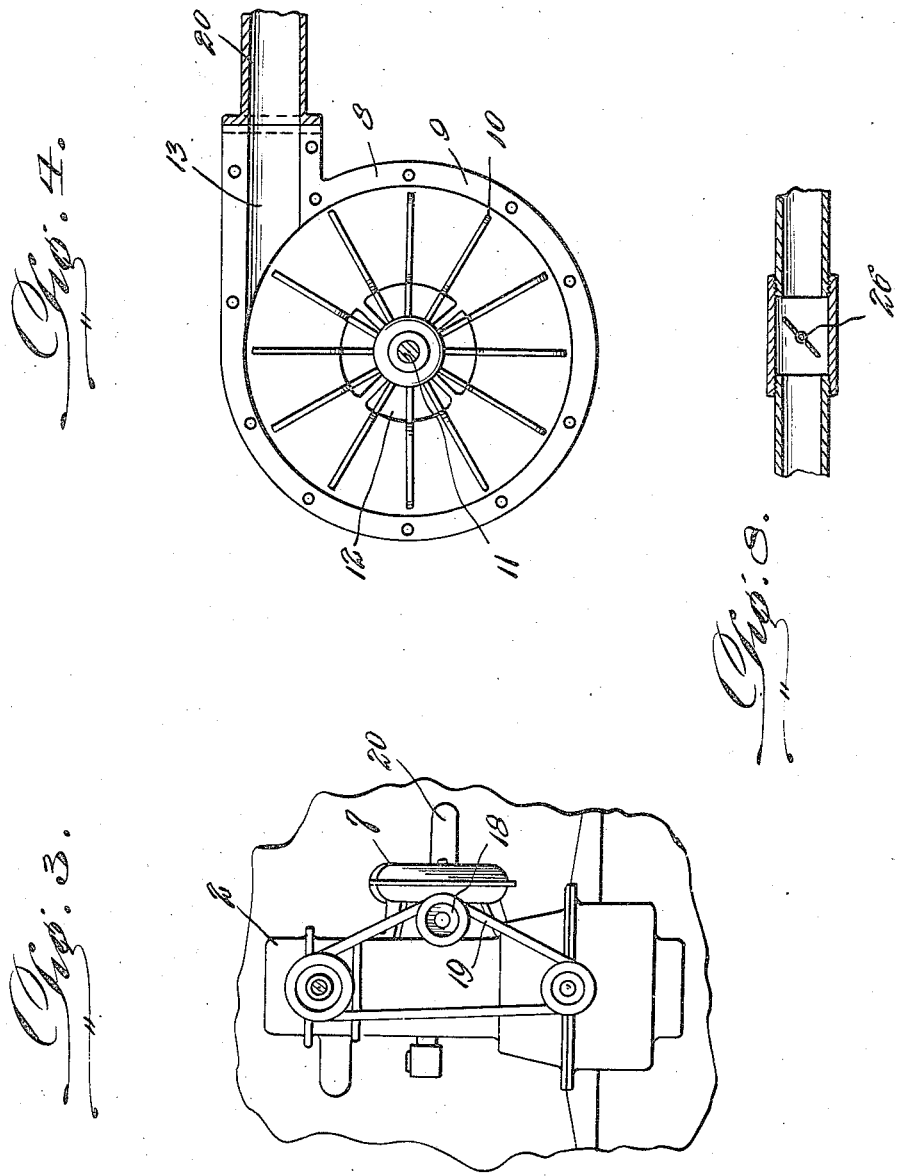

Patented July 29, 1924.

1,502,745

UNITED STATES PATENT OFFICE.

GEORGE W. PRICE, OF LEAKSVILLE, NORTH CAROLINA.

COOLING APPARATUS FOR MOTOR VEHICLES.

Application filed August 28, 1922. Serial No. 584,623.

*To all whom it may concern:*

Be it known that I, GEORGE W. PRICE, a citizen of the United States, residing at Leaksville, in the county of Rockingham and State of North Carolina, have invented new and useful Improvements in Cooling Apparatus for Motor Vehicles, of which the following is a specification.

In carrying out the present invention it is my purpose to provide a cooling apparatus whereby the lower extremities of the occupants of the motor vehicle may be cooled by the blowing of air thereon.

It is also my purpose to provide cooling apparatus of the class described which may be driven from the motor of the vehicle; which will embody the desired features of simplicity, efficiency and durability and which may be controlled by the occupant of the vehicle.

With the above recited objects in view, and others of a similar nature, the invention resides in the construction, combination and arrangement of parts set forth in and falling within the scope of the appended claims.

In the accompanying drawings:

Figure 1 is a fragmentary sectional view through a motor vehicle showing my invention installed.
Figure 2 is a fragmentary top plan view of the same.

Figure 3 is an end view showing the relative positions of the motor and the blower.

Figure 4 is a sectional view through the blower.

Figure 5 is a fragmentary plan view of the instrument board showing the control knob thereon.

Figure 6 is a sectional view through the distributor nozzle.

Figure 7 is a view in side elevation of the distributor nozzle.

Figure 8 is a sectional view showing the controlling valve.
Referring now to the drawings in detail, 1 designates the forward end portion of a motor vehicle including the engine 2, hood 3 covering the engine, cowl 4 and instrument board 5.
Arranged alongside of the engine 2 and fastened thereto by means of a bracket 6 is a blower 7 of the centrifugal type. In the present instance this blower 7 embodies a two-part housing formed of sections 8 provided with flanges 9 that are bolted together, and a bladed rotor 10 fixed upon a shaft 11 journaled in bearings carried by the two walls of the housing, the blades acting to draw air into the housing through the inlet 12 that is arranged centrally of the housing and to discharge the air through a tangential discharge passage 13 that is formed by extensions integral with the sections or walls of the two-part housing.

In the present instance, the inner end of the shaft 11 of the blower is equipped with a beveled pinion 14 that meshes with a similar pinion 15 fixed upon one end of a shaft 16 journaled in suitable bearings 17 carried by the cylinder block. This shaft 17 lies in a plane parallel with the crank shaft of the engine and its outer end terminates adjacent to the fan belt pulley and is equipped with a belt pulley 18. Over the belt pulley 18 and the belt pulleys on the fan shaft and the front end of the crank shaft is trained an endless belt 19 by which the engine fan and the shaft 17 are driven from the crank shaft. Thus, in the operation of the engine motion is transmitted to the bladed rotor 10 through the belt 19, pulley 18, shaft 17 and beveled pinions 15 and 14, thus enabling the fan to deliver air to the tangential discharge passage 13.

In accordance with my invention this passage 13 is connected with one end of an air pipe 20 that extends toward the leg compartment in front of the front seat of the vehicle, as clearly illustrated in Figures 1 and 2 of the drawings. This air pipe 20 is bent upwardly under the cowl 4 and has its upper extremity turned at right angles, as at 21. This extremity 21 is equipped with a revoluble union 22. Connected to the end 21 of the air pipe by means of the union 22 is one end of an air distributing nozzle 23. This nozzle 23 extends across the front of the vehicle in front of the instrument board 5, as clearly shown in Figure 1. The distributing nozzle is formed with a series of discharge apertures 24 spaced apart along the length of the nozzle and is also formed with a handle 25 arranged in a plane at right angles to the nozzles, so that the nozzle may be rotated in order that the air may be discharged in any desired direction.

Located in the upwardly extending portion of the air pipe 20 is a butterfly valve 26, as shown in Figure 8 of the drawings. To the shaft of the butterfly valve 26 is connected one end of an arm 27 and the other end of the arm 27 is connected by means of a link 28 with a crank 29 formed on one end of a shaft 30 revolubly mounted in the instrument board 5 and having its outer end equipped with a knob 31 provided with a finger 32 adapted to register with "on" and "off" marks on the instrument board. When the knob 31 is turned to the "on" position motion is transmitted through the shaft 30, crank 29 and link 28 to the arm 27, thereby opening the valve 26, while when the knob is turned to the "off" position motion is transmitted to the butterfly valve 26 to close the latter, thereby cutting off the supply of air to the nozzle.

I have entered into a detailed description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claims.

Having thus described the invention, what is claimed as new, is:

1. In an occupant cooling apparatus for motor vehicles, the combination with a transverse distributing nozzle arranged in an elevated horizontal position directly beneath the cowl of the vehicle, an air pipe leading to said nozzle, an air blower connected to said air pipe, driving connections between said blower and the engine of the vehicle, means whereby said nozzle may be rotated from the driver's seat to direct the air in the desired direction, a valve in said air pipe whereby the supply of air to the nozzle may be controlled or cut off, and means on the instrument board of the vehicle for operating said valve.

2. In an occupant cooling apparatus for motor vehicles, the combination with a transverse distributing nozzle arranged in an elevated horizontal position directly beneath the cowl of the vehicle, an air pipe leading to said nozzle, an air blower connected to said air pipe, driving connections between said blower and the engine of the vehicle, and means whereby said nozzle may be rotated from the driver's seat to direct the air in the desired direction.

In testimony whereof I affix my signature.

GEORGE W. PRICE.